United States Patent [19]

Perilhou

[11] 3,992,925

[45] Nov. 23, 1976

[54] DEVICE FOR ULTRASONIC SCANNING
[75] Inventor: Jean Robert Perilhou, Bourg La Reine, France
[73] Assignee: U.S. Philips Corporation, New York, N.Y.
[22] Filed: Dec. 4, 1974
[21] Appl. No.: 529,360

[30] Foreign Application Priority Data
Dec. 10, 1973 France .............................. 73.43904

[52] U.S. Cl. ............................................... 73/67.7
[51] Int. Cl.² ........................................ G01N 29/04
[58] Field of Search ..................... 73/67.8 S, 67.7

[56] References Cited
UNITED STATES PATENTS

| | | | |
|---|---|---|---|
| 3,251,219 | 5/1966 | Hertz et al. ........................ | 73/67.7 |
| 3,470,868 | 10/1969 | Krause et al. ................. | 73/67.8 S X |
| 3,693,414 | 9/1972 | Soldner ........................ | 73/67.8 S X |

Primary Examiner—James J. Gill
Attorney, Agent, or Firm—Frank R. Trifari; Ronald L. Drumheller

[57] ABSTRACT

An ultrasonic examination device comprising two curved converging mirrors, the points of focus of which differ and are separated from each other over a distance equalling the width of the image plane. The device furthermore comprises two pairs of mosaics, formed by transducers, which are mounted back-to-back and which rotate about axes which pass through the points of focus of the said mirrors and which are perpendicular to the image plane.

The four mosaics, the central transducer of which can be connected as an emitter by pulses, are successively actuated, i.e. once per revolution. The device and the circuits used make it possible to register each surface having a given continuity, even if this surface exhibits given inclinations.

7 Claims, 4 Drawing Figures

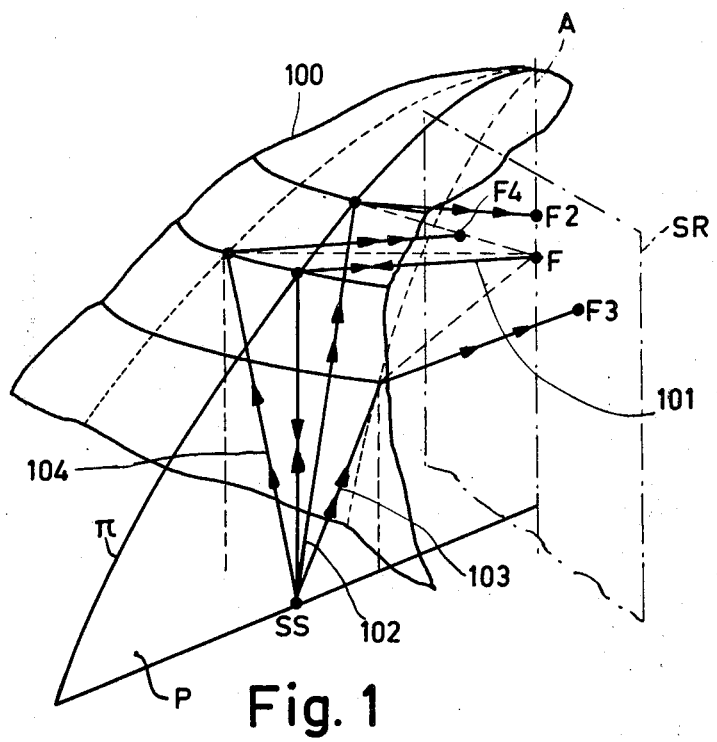
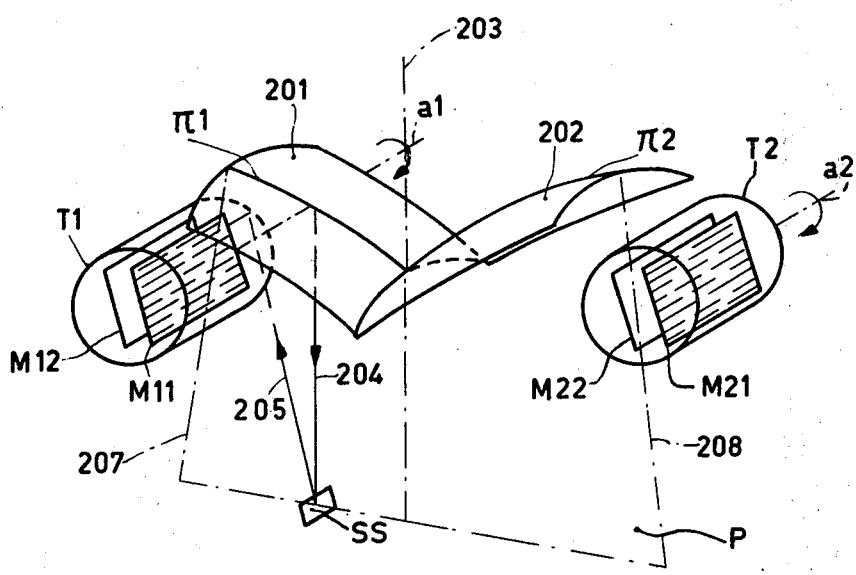
Fig. 1
Fig. 2

DEVICE FOR ULTRASONIC SCANNING

The invention relates to a device for ultrasonic scanning, comprising a reflector having a parabolic surface which intersects each plane perpendicular to the image plane according to a curved line which is symmetrical with respect to the image plane, the said reflector serving to reflect ultrasonic beams which are emitted, via the point of focus of the reflector, by at least one emitter receiver composed of discrete elements, the composite emitter/receiver performing a rotary movement about an axis which extends through the point of focus and which is perpendicular to the image plane. The device according to the invention can be used notably for the examination of the foetus within pregnant human females.

U.S. Pat. No. 2,453,502 describes a method of analysis in which use is made of two parabolic reflectors, one of which reflects beams emitted by an ultrasonic source which is arranged in the point of focus to the objects to be analysed according to parallel trajectories, while the other reflects the beams returned by this object according to diverging trajects to a flat mosaic of receive elements.

Furthermore, French Pat. of Addition No. 70,023 describes a method of analysis in which use is made of a cylindrical-parabolic mirror which is used in combination with an ultrasonic source arranged in the point of focus of the mirror and performing a rotary movement so as to emit a rotating beam which is reflected by the mirror to a leaf-shaped material to be examined.

The invention has for its object to provide a device of the kind set forth, by means of which signals can also be received from surfaces enclosing a comparatively arbitrary angle with the emitted beam.

The device according to the invention is characterized in that it comprises a. two reflectors, the main sections of which bound the image field and form a continuous line having a symmetry axis which coincides with the axis of the image field, the points of focus of the reflectors being separated from each other over a distance which amounts to at least the width of the image field, b. for each reflector one flat mosaic of transducers which co-operates therewith, each mosaic comprising a central transducer which can be switched over so as to function as a source for emitting ultrasonic beams, the said mosaics being capable of rotation in the same direction and at the same speed such that the mosaics are continuously mutually parallel, their plane extending perpendicular to the image plane.

Using such a device, it is possible to receive not only the beams formed by reflection of the parallel and inclined analysis beams situated in the image plane, but also the beams which are formed by the reflection of the inclined analysis beams which are situated in planes outside the image plane.

The invention will be described in detail hereinafter with reference to the diagrammatic drawing.

FIG. 1 shows the geometry of the ultrasonic beams reflected by a parabolic reflector in order to explain the principle on which the invention is based.

FIG. 2 shows an example of the use of this principle in a diagrammatically shown device according to the invention.

Figure 3:
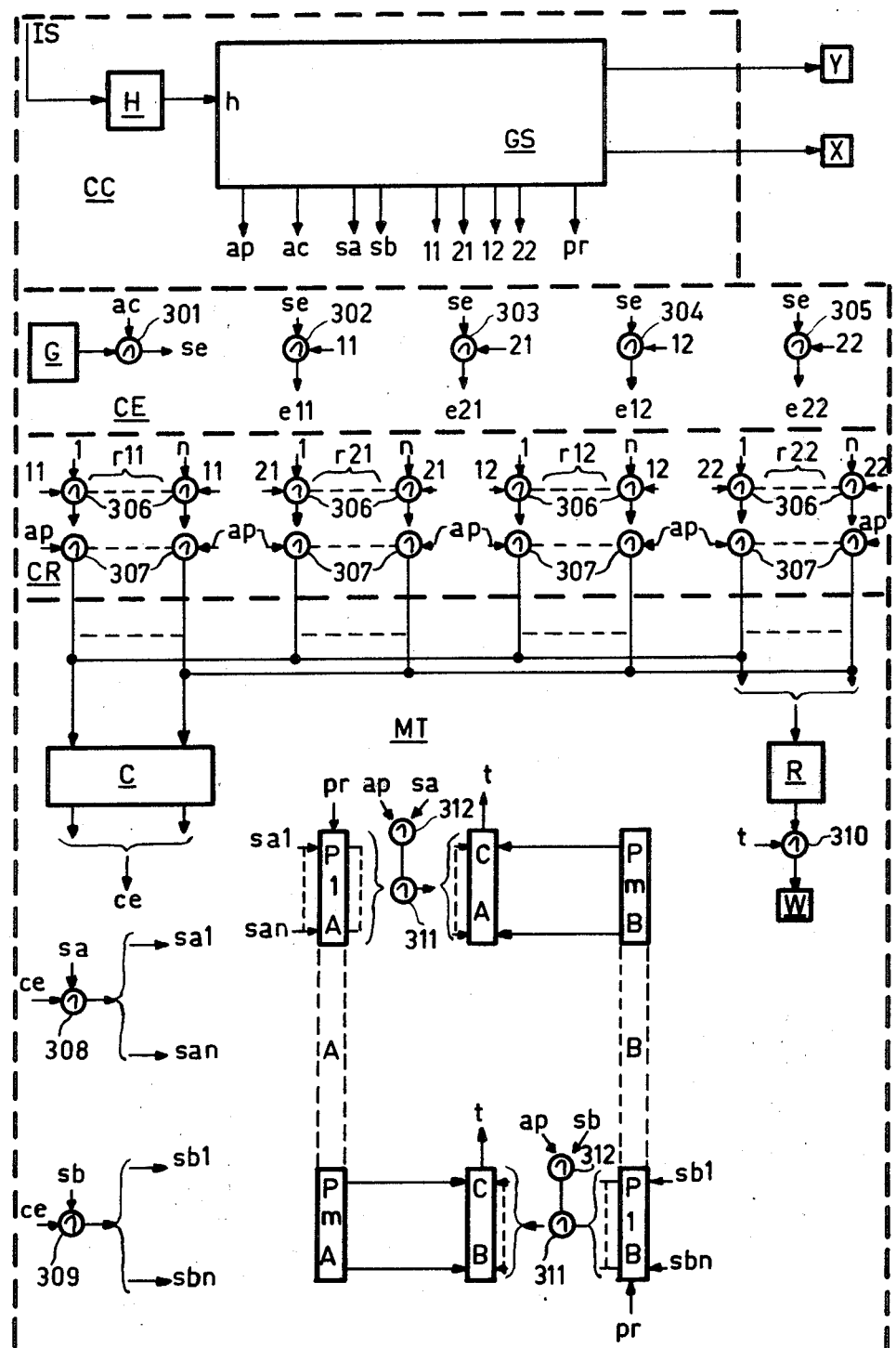
FIG. 3 shows an embodiment of circuits to be used in the device shown in FIG. 2.

FIG. 1 shows a part of a parabolic reflector 100. The surface of this reflector is obtained by the rotation of a partly shown parabola $\pi$ about an axis A. The plane containing the parabola $\pi$ and the axis A is referred to as the examination plane or the image plane. The point of focus F of the reflector 100 is situated in this plane on the axis A.

Thus, because of its construction the reflector 100 shown intersects the image plane P according to a parabolic line $\pi$, and intersects each plane perpendicular to the plane P according to a curved line which is symmetrical with respect to the plane P.

If an ultrasonic beam 101 which passes through the point of focus and which extends in the plane P is directed to the reflector, this beam is reflected by the reflector in a direction parallel to the axis A. If it is assumed that the reflected bundle is incident on a surface element SS, four different cases are possible:

1. the surface element SS is perpendicular to the incident beam 101. This beam is then returned according to a "return trajectory" which coincides with the "emission trajectory", with the result that the beam is incident on a plane SR, containing the axis A and extending perpendicular to the plane P, in the point of focus F.

2. The surface element SS occupies an inclined position, but the normal to SS is situated in the plane P. The incident beam 101 is then returned in this plane, for example, according to the trajectory 102, and will be reflected to the axis A by the reflector according to a line which, in conjunction with the connection line between the point of focus F and the point of incidence on the reflector, encloses an angle which is dependent of the angle enclosed by the normal SS and the axis A. The beam is then incident on the plane SR at the point F2 on the axis A.

3. The surface element SS occupies an inclined position, its normal being in a plane perpendicular to the plane P. The reflected beam is then situated outside the plane P, in which case there are two possibilities:

3a. the reflected beam 103 is situated before the plane P and is incident on the plane SR in the point F3.

3b. the reflected beam 104 is situated behind the plane P and is incident on the plane SR in F4.

In the four above cases the return beams are reflected in different planes thanks to the special shape of the reflector. When the receive surface SR is formed by discrete transducers which are symmetrically distributed with respect to the emitted beam 101, the position of the points of incidence of the return beams on this surface will be determined by the orientation of the surface element SS which forms the echo signal and, as usual, the delay time of the ultrasonic beam for completing the traject can be used for determining the position of the surface element SS in the plane P.

The invention utilizes the described principle to realize an ultrasonic examination device in which the precision of reproduction is substantially improved compared with the examination devices used thus far, the majority of which can reproduce only signals which correspond to the reflections on surfaces substantially perpendicular to the scanning beam.

FIG. 2 diagrammatically shows an embodiment of a device according to the invention.

This device comprises two reflectors 201 and 202 which are in fact surface portions of two different paraboloids, the main section of one paraboloid being shaped as a parabola $\pi 1$, while the other is shaped as a parabola $\pi 2$. These main sections are situated in the image plane P (denoted by broken lines in the Figure). In the image plane P the two main sections $\pi 1$ and $\pi 2$ of the reflectors 201 and 202 form an uninterrupted line which is symmetrical with respect to the axis 203 of this plane. The orientation of the reflectors 201 and 202 is such that the points of focus thereof (not shown) are situated at a given distance from each other which is at least equal to the width of the image plane P. As a result of this arrangement, the plane is completely free. Such an arrangement is very advantageous because of the fact that it does not limit the opening angle of the cone formed by the beams reflected by the inclined surfaces.

In this embodiment each of the said reflectors cooperates with two flat mosaics of transducers, i.e. M11 and M12 for the reflector 201, and M21 and M22 for reflector 202, the said mosaics being mounted back-to-back. Each assembly formed by two mosaics is mounted inside a drum (T1 and T2, respectively) which is transparent to ultrasonic waves, the said drums being capable of performing a rotary motion in the same sense about an axis ($a1$ and $a2$ respectively) perpendicular to the plane P and passing through the point of focus of the relevant reflector (201 and 202, respectively). The mosaics of one and the same assembly are symmetrical with respect to the axis of rotation of the drum in which they are mounted.

In practice the described device can be used in surroundings which are favourable for the propagation of ultrasonic waves. The device is preferably situated in a bag of plastic material which is filled with a liquid (water or oil) having a suitable acoustic diffraction index. This liquid is in contact with the body to be examined. The drums are also filled with the same liquid to prevent turbulence in the area of the transducers during rotation thereof.

The transducers of each mosaic can be switched, the central transducer being usable as an emitter or receiver, while the others are used as receivers.

FIG. 2 shows the trajectory of a beam 204 which is emitted by the central transducers of the mosaic M11 and which is reflected by the reflector 201 so as to form a scanning beam. When this beam encounters the separation surface element SS, it forms an inclined return beam 205, which, after having been reflected again, is incident on one of the transducers of the mosaic.

FIG. 2 is a diagrammatic view. It was previously said that it can be ensured that the received beams are incident on the discrete elements of the mosaic approximately at right angles. The surface of these mosaics may of course be concave. However, it is alternatively possible to keep this surface flat, as in the Figure, and to make this surface co-operate with a converging, plane-concave lens.

Figure 4:
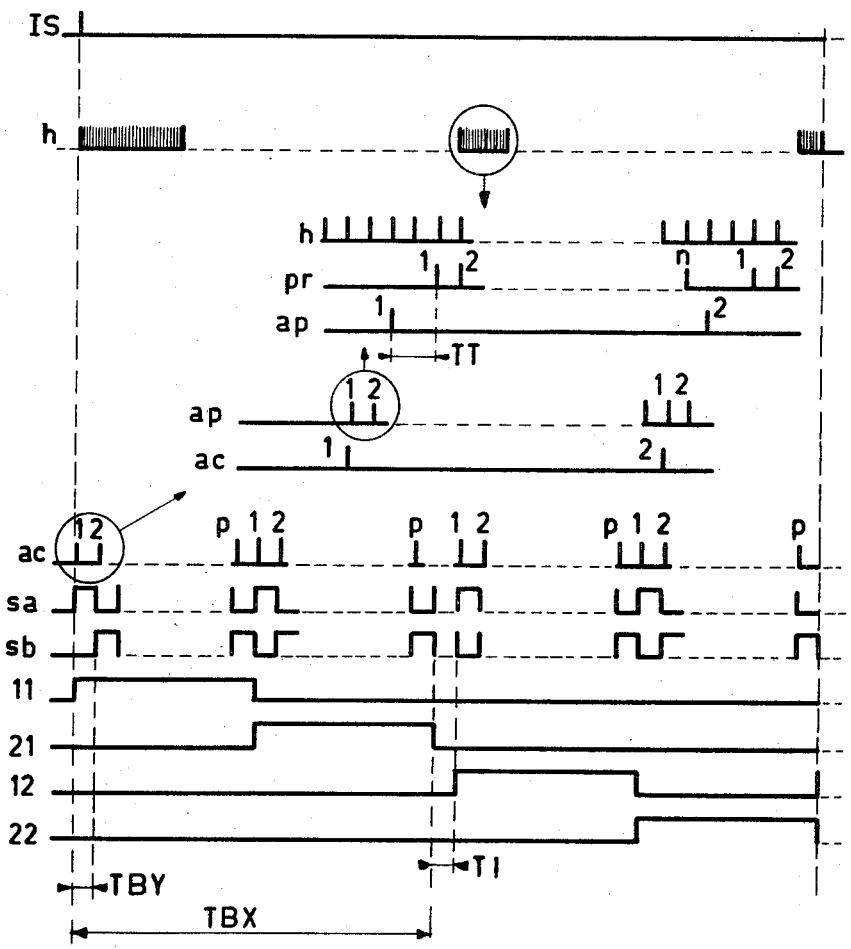
FIG. 4 shows the diagram of signals occurring in the circuits of FIG. 3.

FIGS. 3 and 4 show an example of circuits which can be used in co-operation with this device.

Before giving a description of the circuit of FIG. 3 and its operation, it will be useful to indicate what is exactly to be expected from this circuit. The primary object is, of course, to cause the emission transducer on the mosaics M11 – M22 to emit parallel scanning beams in the image plane P and to display, for example, on the screen of a cathode ray tube, at which points the scanning beams are reflected by a body scanned. To this end, the drums T1 and T2 (see FIG. 2) rotate at the same speed and in the same direction. Assume that the beginning of the scan is the instant at which the emission transducer of the mosaic M11 is in a position such that the beam emitted by this transducer coincides with the left-hand boundary 207 of the plane P. The transducer is then pulse-wise excited until the instant at which, because of the rotation of the drum T1, the beam emitted by this transducer reaches the edge of the reflector 201 which adjoins the reflector 202. Subsequently, the emission transducer of the mosaic M21 is energized in the same manner at the instant at which, thanks to a suitable coupling of the rotation of the two drums T1 and T2, it assumes a position such that the beam emitted by this transducer is incident on the edge of the reflector 202 which adjoins the reflector 201. Because of the rotation of the drum T2, the beam moves to the right until it coincides, after reflection, with the right-hand boundary 208 of the plane P.

By way of the control of the emission transducers of the mosaics M11 and M12, scanning beams are thus formed which pass through the entire plane P. It is thus possible to register a first image in the manner which will yet be described. The second image is registered in the same manner by means of scanning beams which are formed by controlling the mosaic M12, and subsequently the mosaic M22. The process is subsequently repeated so that per revolution of the drums two images are formed. The resolution, i.e. the distance $\Delta x$ between two adjoining points which can still be distinguished by the scanning beams, is dependent of the time interval $\Delta T$ between two control pulses of the emission transducers at a given speed of rotation of the drums. As will yet be described, in practice echo signals are formed at different points of the trajectory of each scanning beam, and the time $\Delta T$ should be chosen as a function of the propagation speed of the ultrasonic waves in the material being examined and of the depth of the region examined.

The echo signals formed by the reflection of the scanning beams at various depths can be displayed as images on a cathode ray tube, the vertical deflection of which (Y-direction) "follows" the motion of each scanning pulse in the vertical direction in FIG. 2, and the horizontal deflection of which (X-direction) follows the progress of the scanning beams from the left to the right, i.e. from line 205 to line 208 in FIG. 2. The plane P is thus considered as the X–Y plane of a system of co-ordinates, the Y axis of which is parallel to the axis 203. This plane is scanned by the scanning beams, and this scan is reproduced on the screen of the cathode ray tube, while the electron beam is blocked by a suitable voltage on the control electrode of the said tube so that the screen remains dark. The image is then composed of points which are formed by the unblocking of the electron beam each time an echo signal is received. The X-position and the Y-position of the point on the screen of the tube should correspond to the X- and Y- co-ordinate in the plane P of the surface element SS which initiated the echo.

The depth of the reflecting surface element SS can be determined from the time expiring between the emission of a pulse and the reception of an echo. To this end, after the actuation of an emission transducer a series of actuation pulses is applied to the receive transducers of the same mosaic. The receive transducers are adapted such that they supply a signal only if an echo signal is incident thereon at the instant at which an actuation pulse is present. In the time interval $\Delta T$, $m$ actuation pulses are delivered, and if one of the receivers of the mosaic supplies a signal under the influence of a given actuation pulse, this means that an echo signal was formed by reflection of the relevant scanning beam at a depth for which the order of the actuation pulse is a measure. The detected signal can be applied to the control electrode of the cathode ray tube so as to make the screen of this tube luminesce in a point-like manner at a location whose Y coordinate corresponds to the said depth.

Each interface surface having a given continuity in the X-direction should be of course be displayed, even if the inclination of the said surface varies in the X-direction, while on the other hand any "parasitic" echo signal should be eliminated, including the parasitic signals which are formed by the surfaces which are discontinuous in the X-direction.

To this end, the received signal is processed such that each surface which has caused an echo signal and which has a given continuity in the X-direction is displayed on the screen of the cathode ray tube, while the discontinuous surfaces are not displayed.

The circuit of FIG. 3 comprises first of all a control circuit CC which comprises a clock generator H which supplies pulses $h$ to a signal generator GS. The clock generator H is synchronized by pulses IS, the first one of which determines the beginning of the scan, the said pulses IS being mechanically derived in known manner from the shaft a1 of the drum T1 when the position of the mosaic M11 is such that an ultrasonic beam emitted by the central transducer is reflected by the reflector 201 according to the left-hand edge 207 of the image plane P. Each pulse IS thus determines the instant of actuation of the mosaic M11. (once for each revolution of the drum T1).

On the basis of the pulses $h$, the signal generator GS forms the following signals:
- selection signals, 11, 21, 12, 22 for the four mosaics in the order M11, M21, M12, M22;
- emission signals $ac$;
- actuation pulses $ap$ for the receivers;
- the vertical deflection signal Y;
- the horizontal deflection signal X;
- signals $sa$, $sb$ and $pr$, the function of which will be described hereinafter.

All above signals are shown in FIG. 4 in the form of a diagram, with the exception of the signals X and Y, only the period of which is shown (TBY and TBX). Some signals are shown on two lines, one of which has a larger time scale, in order to clarify the description.

The first line of FIG. 4 shows a pulse IS which synchronizes the clock generator H. The $h$ pulses are shown on the second and the third line. The generator GS then supplies the first selection signal 11 (actuation of the mosaic M11), and a first pulse for controlling the emmission transducer, the said pulse being denoted by 1 on the line $ac$. Druing the selection signal 11 (and during each subsequent selection signal 21, 12, 22) $p$ emitter control pulses $ac$ are produced.

In FIG. 3 below the control circuit CC, an emission circuit CE is shown. The emission circuit CE comprises an ultrasonic generator G, having connected to its output an AND-gate 301 which is rendered conducting under the influence of the pulses $ac$. The emission circuit CE furthemore comprises four AND-gates 302, 303, 304, 305 which become successively conducting under the influence of the signals 11, 21, 12 and 22 so as to conduct the ultrasonic pulses SC supplied by the output gate of the generator G to the emission transducer $e11$, $e21$, $e12$ and $e22$ of the mosaics M11, M21, M12 and M22.

FIG. 4 shows that between the end of the signal 21 and the beginning of the signal 12 (i.e. between two full scans of the image field) there is a time interval T1. The geometry of the reflectors makes it desirable to make the mosaics operate slightly shorter than ¼ revolution of the drum. The same time interval T1 appears at the transition from mosaic M22 to M11 (not visible in FIG. 4).

Between two successively supplied pulses $ac$ the signal generator GS supplies actuation pulses $ap$ for the receivers (sixth and seventh line of FIG. 4) which determine $m$ different levels along each scanning beam formed under the influence of the pulses $ac$.

Below the emission circuit CE, FIG. 3 shows a receive circuit CR. This circuit mainly comprises:

1. $4 \times n$ AND-gates 306 (selection gates) through which the signals pass which are supplied by each of the receive transducers of each of the four mosaics which are successively actuated by the signals 11, 21, 12, 22. The FIG. shows from left to right: the $n$ gates 306 of the receive transducers $r11$ of the mosaic M11, the $n$ gates 306 of the receivers $r21$ of the mosaic M21, the $n$ gates 306 of the receivers $r12$ of the mosaic M12, and finally the $n$ gates 306 of the receivers $r22$ of the mosaic M22.

2. also $4 \times n$ AND-gates 307 (actuation gates) which are coupled to the $4 \times n$ selection gates 306, and through which the same receive signals pass. These gates are controlled by the pulses $ap$. The receive signals are applied on the one side to a delay circuit R, the function of which will be described hereinafter and on the other side to a coding circuit C. This coding circuit C and the delay circuit R form part of a store and transfer circuit MT.

Besides the coding circuit C and the circuit R, the circuit MT mainly comprises two registers A and B. These are shift registers which each comprise $m$ sub-registers, each sub-register having $n$ positions. The register A is divided into sub-registers $P1A \ldots PmA$, and the register B is divided into the sub registers $P1B \ldots PmB$, Consequently, each register comprises as many sub-registers as there are levels along each scanning beam, and the number of positions in each sub-register equals the number of transducers per mosaic.

For each of the $m$ levels, the registers A and B serve for the storage of not only the identity of the receiver which has supplied a signal for a given read beam, but also the identity of a given number of S receivers which are situated in the vicinity of the receiver in the mosaic used. In addition to the "actual" signal, S simulated signals are thus introduced which correspond to receive beams having different angles of incidence (compare FIG. 1), the value of which differs only little with respect to each other and is approximately equal to that of the receive bundle which has caused the "actual signal". Each actual or simulated signal leads to the registration of an elementary information "1" in the register in a position assigned to the relevant transducer.

The registers A and B are alternately actuated in the rhythm of the scanning beams. To this end, the generator GS supplies alternating signals $sa$ and $sb$ which have a phase difference of 180° with respect to each other (see the ninth and the tenth line in FIG. 4). When the first control pulse *ac* is produced, the signal *sa* is present and opens the *n* input gates of the register A which are shown as a single gate 308. These gates enable the storage in the *n* positions of the first sub-register P1A of the register A of the coded information supplied by the coding circuit C (i.e. the identity of the receivers of the "actual" and "simulated" signals) which is formed by processing the information supplied to the coding circuit (i.e. the identity of the receiver of the actual signal). This is in fact the storage in a store of the elementary information "1" in positions assigned to the receivers of an actual or simulated receive beam.

After the information as regards the first level has been registered, and before the pulse *ap* which determines the second level is formed, this information is shifted in the register A from the first sub-register P1A to the second sub register P2A. This shift is controlled by pulses *pr* formed by the signal generator GS. These pulses *pr* are shown on the fourth line of FIG. 4. They are supplied simultaneously with *n* pulses *h* which are supplied by the clock generator H, and they begin a given time TT after the preceding pulse *ap*. The time TT corresponds to the delay time of the information between the mosaic and the register.

The sub-register P1A is thus ready to receive the information corresponding to the second level, determined by the second pulse *ap*. This process is repeated until the information corresponding to all *m* levels of the first scanning beam has been stored in the register A.

When the next pulse *ac* (the second) is formed by the signal generator GS, the signal *ab* is also available which means that information is stored in the register B (in the same manner as in register A) in the form of coded pulses which relate to the different levels of the second read beam. Now the *n* input gates of register B (shown as a single gate 309 in the left-hand lower part of FIG. 3) are open for the transfer of the information supplied by the coding circuit C.

It is to be noted that the sequence of the positions of the receivers in register B is reversed with respect to register A: the connection sb1 corresponding to the receiver 1 of the mosaic used, leads to the $n^{th}$ position of the first sub-register P1B of the register B, while the connection *sbn* terminates at the first position of the sub-register. This particularly can be explained on the basis of the processing of the information stored in the two registers.

The store and transfer circuit MT also comprises two comparison circuits CA and CB. Each circuit comprises comparators which are adapted to supply a pulse *t* when the same elementary information "1" is stored in the positions of the registers A and B with which they are connected. The pulses *t* are supplied to the output gate 310 of the delay circuit R, and when this gate becomes conducting under the influence of a pulse *t*, it connects the outputs of the delay circuit to the control electrode W of the cathode ray tube. The circuit R itself is connected to the $4 \times n$ outputs of the receive circuit CR, and is thus each time connected, under the control of the pulses *ap*, to the *n* receivers of one of the mosaics. Assume that one of these *n* receivers supplies a signal E for the level N of the $(r+1)^{st}$ scanning beam. Assume also that the comparison of the corresponding coded information (stored in the first sub-register P1B of the register B, for example) gives rise, in conjunction with the previously stored coded information for the same level of the $r^{th}$ scanning beam (initially stored in sub-register P1A and transferred to the last sub-register P*m*A of the register A under the influence of the pulse pr), to the formation of a pulse *t*. The signal E is then supplied, delayed by the delay time between the input of the coding circuit C and the output of the comparator used, to the control electrode of the cathode ray tube, so that a dot appears on the screen of this tube. In order to preclude any undesired formation of a dot on the screen, the transfer of the coded information to each comparator is effected via an AND-gate 311 which is controlled by the output of a second AND-gate 312 which in turn is controlled by, on the one side the pulses *ap* and, on the other side, either by the signal *sa* (for selection of comparator CA) or the signal *sb* (for selection of the comparator CB).

Summarized, the operation is then as follows:

the coded information corresponding to the *m* levels of the first scanning beam is stored in the register A; each level occupies *n* positions, i.e. one sub-register; after the controlled shifting of the information in the register, the level 1 occupies the last sub-register (P*m*A), while the level 2 occupies and second last sub-register, and the level *m* finally occupies the first subregister;

the coded information corresponding to the level 1 of the second scanning beam is stored in the first sub-register P1B of the register B; if this information corresponds in at least one of the positions to information in a corresponding position of the last element of register A (corresponding to the level 1 of the first scanning beam) a pulse *t* is formed which causes the formation of a dot on the screen of the tube at the level of the level under consideration.

The pulses *pr* which occur after the pulses *ap* which have determined the level 1, ensure that:

1. in the sub-register P*m*A the coded information is shifted which corresponds to the level 2 of the first scanning beam, 2. in the second sub-register P2B of the register B the coded information is shifted which corresponds to the level 1 of the second scanning beam. As a result, the register element P1B is ready, under the influence of the pulse *ap* which determines the level 2, to receive the coded information which corresponds to this level.

This process is continued for the *m* levels of the second scanning beam. When the total information as regards these levels has been stored in the register B, no further information is present in the register A, so that this register is ready to receive newly coded information which corresponds to the *m* levels of the third scanning beam and which is to be compared with the information corresponding to the m levels of the second scanning beam.

It is thus achieved that:

1. the levels at which a given scanning beam has been subjected to a reflection are stored in a store, and that it is also registered in this store which transducers would have been struck by the reflected beam if at the same level a reflecting surface element would have been present whose normal encloses a small angle with the normal of the actual surface element, 2. a dot appears on the screen of the cathode ray tube is two adjoining scanning beams are incident at the same level on surface elements having approximately the same position, 3. only surfaces of the scanned structure are displayed which have a given continuity in the X-direction.

For a practical embodiment of the device according to the invention, the following numerical values can be used:

speed of rotation of the drums: 7.5 revolutions per second; this means 15 complete images per second, frequency of the emission pulses: 2000 pulses per second, duration of the emission pulses: 25 to 30 ms, clock frequency: 300,000 Hz, mosaics comprising 5 × 5 elements, so 25 transducers, coding: storage in the store of the positions of either all transducers which surround the transducer which has received a signal as immediate neighbours, or four transducers which are situated on both sides of the said transducer.

Reconsidering FIG. 2 and bearing in mind the described method, it is to be noted that, when one of the mosaics M11 and M12 is actuated by the signals 11 and 12, a scanning beam emitted by this mosaic can be reflected by a surface element whose position is such that the receive beam is incident on receivers on the mosaics M21 and M22, respectively. It is also to be noted that as the scanning controlled via the mosaics M11, M12 is nearer to the central line of the image plane P, the chance that an echo signal is incident on the receivers of these mosaics becomes increasingly smaller, while the chance that receivers of the mosaics M21 and M22 are struck increases. An analogous situation occurs when the moaics M21 and M22 are actuated.

In order to avoid loss of information which might arise from this situation, the actuation signals 11, 21, and 12, 22 can be supplemented as follows: introduce on the one side the signals 11' and 12' which serve exclusively for opening the gates 306 of the receive circuit for a time T after the disappearance of the signals 11 and 12, and on the other side signals 21' and 22' which open these gates for the same duration prior to the appearance of the signals 21 and 22.

The foregoing description was given merely by way of example, because within the scope of the invention a plurality of variants can be realized by those skilled in the art.

1. A device for ultrasonic scanning, comprising a reflector having a parabolic surface which intersects each plane perpendicular to an image plane according to a curved line which is symmetrical with respect to the image plane, said reflector serving to reflect ultrasonic beams which are emitted from the point of focus of the reflector by at least one emitter/receiver composed of discrete elements, and means for rotating the emitter/receiver about an axis which extends through the point of focus and which is perpendicular to the image plane, said device being characterized in that it comprises two reflectors defining an image field and forming a continuous line having a symmetry axis which coincides with the axis of the image field, the points of focus of the reflectors being separated from each other over a distance which amounts to at least the width of the image field and for each reflector an emitter/receiver having at least one flat mosaic of transducers co-operating therewith, each mosaic comprising a central transducer which can be switched over so as to function as a source for emitting ultrasonic beams, said mosaics being capable of rotation in the same direction and at the same speed such that the mosaics are continuously mutually parallel in planes perpendicular to the image plane.

2. A device as claimed in claim 1, characterized in that each reflector co-operates with two flat mosaics of transducers which are mounted back-to-back, and circuit means connected to the mosaics so that during one revolution of the mosaics initially the first mosaic of the first reflector is actuated, followed by the first mosaic of the second reflector, followed by the second mosaic of the first reflector, and finally by the second mosaic of the second reflector.

3. A device as claimed in claim 1, characterized in that the mosaics co-operating with the same reflector are rigidly arranged in a drum of a material which transmits ultrasonic waves, it being possible to effect the rotation of the mosaics in that the drums are rotatable, while the shaft of at least one of the drums is provided with a pulse generator for generating synchronization pulses.

4. A device as claimed in claim 1, characterized in that there are provided:
   a. a control circuit comprising a signal generator and a clock generator which is synchronized with the rotation of the mosaics, said signal generator being adapted to supply at least the following signals:
      per revolution, four successive selection signals for the four mosaics,
      P emitter control pulses during each of the successive selection signals,
      m receiver actuation pulses between each two successive emitter control pulses
   b. an emission circuit, comprising an ultrasonic generator and a plurality of gates for the successive connection of the ultrasonic generator to the central transducers of each of the mosaics, said gates being controlled by the selection signals and the emitter control pulses
   c. a receive circuit which comprises a plurality of gates, the input of which is connected to the transducers of the four mosaics and which are controlled by the selection signals and the receiver actuation pulses, and
   d. connection means for connecting the outputs of the receive circuit to a registration device which co-operates with the ultrasonic device.

5. A device as claimed in claim 4, characterized in that the signal generator is also adapted to supply two alternating series of pulses, the duration of which is substantially equal to the distance between two emitter control pulses, the beginning of each pulse of the one series coinciding with the odd emitter control pulses, and of the other series coinciding with the even emitter control pulses, there furthermore being provided a combined storage and transfer circuit, comprising:
   a. a coding circuit comprising inputs which are connected to the outputs of the receive circuit and which is adapted, when one of its inputs carries a signal, to make an output corresponding to this input plus predetermined other outputs carrying a signal,
   b. a comparison circuit and two storage registers each of which is formed by m sub-registers, the first of which are connected to the outputs of the coding circuit through gates, which are controlled by the alternating pulse series of the signal generator.

6. A device as claimed in claim 5, characterized in that a. the signal generator is further adapted to generate a series of n shift pulses between each two successive actuation pulses, n being equal to the number of transducers per mosaic, the n shift pulses coinciding with the clock pulses generated by the clock generator, b. the storage registers are shift registers in which the shifting of the information is effected under the influence of shift pulses, each sub-register comprising n positions, the coding circuit having n outputs which can be alternately coupled to the n positions of the first sub-registers while each output corresponds to a transducer so that the presence of a signal on an output signifies the presence on the relevant transducers of a real receive signal or a receive signal simulated by the coding circuit, c. the comparison circuit consists of two portions, each of which comprises n comparators, the inputs of the $n$ comparators of the first portion being connected to the n positions of the first sub-register of the one shift register and to the $n$ positions of the $n^{th}$ sub-register of the other shift register, the n comparators of the second portion being connected to the n positions of the $n^{th}$ sub-register of the one shift register and to the n positions of the first sub-register of the other shift register, d. a delay circuit is provided, the input of which is connected to the output of the receive circuit, its output being connected, through an output gate, to a registering device, the said output gate being opened by a pulse generated by the comparison circuit when one of the comparators receives a signal on both its inputs.

7. Apparatus for ultrasonic scanning of a body, comprising:

a flat mosaic of discrete ultrasonic transducers, a central transducer of which may function as a source of ultrasonic waves;

means for rotating said mosaic about an axis parallel to the plane of said mosaic, said axis defining an image plane which is perpendicular thereto, said image plane symmetrically intercepting said mosaic;

a reflector for reflecting ultrasonic waves from said central transducer to a body intercepted by said image plane and for reflecting ultrasonic echo waves from said body back to said mosaic, said reflector being symmetrically intercepted by said image plane and having a surface in the shape of a portion of a paraboloid, the focus point of which coincides with the intercept of said axis and image plane.

* * * * *